(12) United States Patent
Becker

(10) Patent No.: US 11,655,630 B2
(45) Date of Patent: May 23, 2023

(54) SEALING ELEMENT AND METHOD FOR PRODUCING A SEALING ELEMENT

(71) Applicant: SIKA TECHNOLOGY AG, Baar (CH)

(72) Inventor: Jean Georges Becker, Worms (DE)

(73) Assignee: SIKA TECHNOLOGY AG, Baar (CH)

(*) Notice: Subject to any disclaimer, the term of this patent is extended or adjusted under 35 U.S.C. 154(b) by 436 days.

(21) Appl. No.: 16/641,846

(22) PCT Filed: Sep. 25, 2018

(86) PCT No.: PCT/EP2018/076026
§ 371 (c)(1),
(2) Date: Feb. 25, 2020

(87) PCT Pub. No.: WO2019/057997
PCT Pub. Date: Mar. 28, 2019

(65) Prior Publication Data
US 2021/0156138 A1 May 27, 2021

(30) Foreign Application Priority Data
Sep. 25, 2017 (DE) .................. 10 2017 122 097.6

(51) Int. Cl.
*E04B 1/68* (2006.01)
*E04D 13/14* (2006.01)
*F16J 15/52* (2006.01)

(52) U.S. Cl.
CPC .............. *E04B 1/68* (2013.01); *E04D 13/14* (2013.01); *F16J 15/52* (2013.01)

(58) Field of Classification Search
CPC ... E04B 1/68; E04B 1/66; E04D 13/14; E04D 13/147; E04D 13/02; E04D 5/10; F16J 15/52; B32B 33/00; B32B 27/04

USPC .......................................................... 277/572
See application file for complete search history.

(56) References Cited

U.S. PATENT DOCUMENTS

| 1,094,893 | A | * | 4/1914 | Grant | ................ E04D 3/362 52/531 |
| 6,503,601 | B1 | * | 1/2003 | Edvardsen | ............. E04D 13/02 428/141 |
| 8,399,088 | B2 | * | 3/2013 | Deng | ....................... E06B 1/62 428/152 |

FOREIGN PATENT DOCUMENTS

| DE | 82 00 019 U1 | 4/1982 | |
| DE | 19914071 A1 | * 10/2000 | ............ E04D 13/02 |
| DE | 102 30 552 A1 | 1/2004 | |
| DE | 601 01 093 T2 | 7/2004 | |
| DE | 20 2008 013 676 U1 | 2/2009 | |
| EP | 0 942 109 A2 | 9/1999 | |

(Continued)

OTHER PUBLICATIONS

Nov. 26, 2018 International Search Report issued in International Patent Application No. PCT/EP2018/076026.

(Continued)

*Primary Examiner* — Beth A Stephan
(74) *Attorney, Agent, or Firm* — Oliff PLC

(57) ABSTRACT

A sealing element, in particular for sealing a frame element with respect to a building component, having a sandwich structure, including: a metallic primary layer which is creped at least in certain regions to form an elongation reserve of the sealing element; a secondary layer; and a bitumen-including filling layer which is arranged between the primary layer and the secondary layer.

8 Claims, 4 Drawing Sheets

(56) References Cited

FOREIGN PATENT DOCUMENTS

WO         95/28536 A1    10/1995
WO    2012/139887 A1    10/2012

OTHER PUBLICATIONS

Mar. 31, 2020 International Preliminary Report on Patentability issued in International Patent Application No. PCT/EP2018/076026.

* cited by examiner

SEALING ELEMENT AND METHOD FOR PRODUCING A SEALING ELEMENT

TECHNICAL FIELD

The present invention relates to a sealing element and to a process for the production of a sealing element.

In particular, the present invention relates to a sealing element which is intended for the sealing of a frame component, for example a window frame, in relation to a component of a built structure, for example a roof region composed of roofing shingles.

BACKGROUND

For avoidance of undesired gaps and unsealed areas during installation of the sealing element, for example non-butting joints or non-planar surfaces, the prior art includes the possibility of forming an elongation reserve, for example in the form of pleated structures, allowing elongation of some regions of the sealing element in order to cope with, or counteract, the non-butting joints and non-planar surfaces. EP 0 755 474 B1 and EP 0 942 109 A2 by way of example reveal a sealing element of this type.

Sealing elements usually used to provide the high sealing-element weight that is helpful for installation and is required for long-lasting sealing by the sealing element usually comprise lead, and are known as lead flashings. However, these often give rise to environmental concerns. If aluminum is used, again comparatively thick aluminum layers are required for pleated sealing elements, and these in turn incur considerable costs, including recycling cost.

SUMMARY

It is therefore an object of the present invention to provide a sealing element which is more environmentally friendly than those of the prior art.

This object is achieved via a sealing element and a process for the production of a sealing element according to disclosed embodiments.

Further advantages and features of the invention are described herein and disclosed in the attached figures.

The invention provides a sealing element with sandwich structure, in particular for the sealing of a frame element in relation to a component of a built structure, comprising:
  a metallic primary layer which has been creped at least in some regions in order to form an elongation reserve of the sealing element,
  a secondary layer and
  a fill layer which comprises bitumen and/or comprises a binder, and which is arranged between the primary layer and the secondary layer.

Comparison with the prior art shows that the bitumen-comprising flexible fill layer permits establishment of a desired, comparatively large, weight per unit area which is firstly helpful during installation and secondly, in the installed condition, brings about an intrinsic weight that supports a sealing functionality of the sealing element, so that there is advantageously no requirement for the use of lead-containing materials. Because the bitumen-comprising fill layer, as heavy bitumen-containing layer, contributes to increased weight, comparatively thin primary layers and/or secondary layers are sufficient; this in turn advantageously permits reduced content of metal that requires recycling. A further factor here favoring reduction of the primary layer and/or the secondary layer is that the primary layer is creped, and not pleated. The person skilled in the art understands creping to mean in particular irregular folding, in particular reflective folding, in which the fold height and the distance from the next fold are randomly distributed. In the case of creping, furthermore, the fold line is by way of example curved, and not straight as in the case of pleating. Materials that can be used as binders, alongside bitumen, are by way of example ethyl-vinyl acetate (EVA), butyl, polyethylene (PE), styrene-butadiene block copolymers (SBS polymers), amorphous poly-alpha-olefins (APAO), thermoplastic elastomers or similar materials.

It is preferable that the sealing element is designed as tape or as strip, and the design of the creping is by way of example such that the creping permits elongation, in particular exclusively unidirectional elongation, along the longitudinal direction of the sealing element. The creping thus forms an elongation reserve which permits, when necessary, elongation of the sealing element at least in some regions, in order to counteract any non-butting joints or non-planar surfaces during the installation of the sealing element. It is moreover possible that the creping of the primary layer extends across the entire sealing element or has been introduced into the primary layer at regular distance intervals in longitudinal direction. It is moreover particularly preferable that the primary layer has been manufactured from aluminum. An example of a possible frame element is a window frame or roof-window frame, and an example of a possible component of a built structure is a roof region composed of roof shingles. It is preferable that the material of the primary layer and/or of the secondary layer corresponds to the material from which the frame element has been manufactured.

In another embodiment of the present invention, the secondary layer is metallic and/or has been creped at least in some regions or is an adhesive layer. Insofar as the secondary layer is metallic and/or has been creped in at least some regions, it is possible to realize bilateral covering with a metal, preferably with a comparatively thin metal layer, which renders the sealing element advantageously weathering-resistant and dimensionally stable. The crepe structures, i.e. folds, positioned in opposition to one another here are different and can be positioned independently of one another. It is preferable that the degree of creping of the primary layer corresponds to the degree of creping of the secondary layer. It is also conceivable that the degree of creping of the primary layer differs from the degree of creping of the secondary layer. "Degree of creping" is a collective expression in particular meaning the average number of folds and/or height thereof per unit of area. A measure that can be used for the degree of creping is by way of example the length ratio of the uncreped metal layer, i.e. of the fully elongated metal layer, to the creped metal layer. As the degree of creping increases, the extent to which the metal layer, for example the primary layer or secondary layer, can be extended increases correspondingly. It is moreover possible that the degree of creping varies along longitudinal direction for the primary layer and/or secondary layer.

The design of the bitumen-comprising fill layer is moreover such that during elongation of the primary layer and/or of the secondary layer it undergoes permanent change of shape, so that the elongation of the sealing element is retained in the installed condition and renewed creping in any regions is prevented. It is also conceivable that, in layering direction, the creped regions of the primary layer and of the secondary layer precisely coincide, or at least to some extent overlap. Insofar as the secondary layer is designed as adhesive layer, the sealing element can advantageously be fixed in simple manner by means of the adhesive layer on the built structure or on a component of a built structure. It is moreover preferable that the primary layer, the fill layer and the secondary layer are directly adjacent to one another and/or that the sealing element by way of example consists exclusively of primary layer, fill layer and secondary layer.

The fill layer advantageously comprises a filler material, in particular an iron-oxide-, baryte-, strontium-ferrite-, ground-limestone- and/or quicklime-comprising filler material. Use of additional filler material in the bitumen-comprising fill layer advantageously allows greater control in adjustment of the weight or density of the sealing element. It is preferable that the composition of the filler material is such that the weight per unit area assumes a value between 2 and 10 kg/m$^2$, preferably between 4 and 8 kg/m$^2$ and particularly preferably between 5 and 7 kg/m$^2$. Particular preference is given here to a mixture of iron oxide, ground limestone and quicklime. It is moreover conceivable that oils have been added to the fill layer. The flexibility of the sealing element can moreover advantageously be controlled via the selection of the filler material. In particular, a bitumen kit with additional filler material is used.

In another embodiment of the present invention, the thickness, measured in layering direction, of the primary layer and/or secondary layer is 0.02 to 0.1 mm, preferably 0.03 to 0.075 mm, or is in essence 0.05 mm. The metal layers of the sealing element are therefore thinner than those with pleating structures, the thickness of which is typically 0.15 mm. In particular, the thicknesses of the primary layer and/or secondary layer are the thicknesses that are measured during the time before creping, or that are present before creping. The magnitude of the thickness here is selected to ensure sufficient stiffness, dimensional stability and weathering resistance for the sealing element. The invention moreover provides that the thickness of the primary layer and/or secondary layer, measured in layering direction, for 50% creping, i.e. for creping with a subsequent degree of creping of 50%, is 0.02 to 4 mm, preferably 0.02 to 1.4 mm, or is in essence 0.04 mm, and/or that the thickness of the primary layer and/or secondary layer, measured in layering direction, for 30% creping, i.e. for creping with a subsequent degree of creping of 30%, is 0.02 to 5 mm, preferably 0.02 to 1.8 mm, or is in essence 0.05 mm.

In another embodiment of the present invention, the proportion of the filler material is 50% to 80%, preferably 60% to 75% and particularly preferably between 65 and 73%, of the fill layer. It is particularly preferable that the filler material in essence comprises 65% of iron oxide and in essence comprises a material based on 18% of limestone. For the purposes of the invention, the expression "in essence" means deviations by +/−10%, preferably by +/−5%, from the respective precise value, and/or deviations in the form of changes that have no functional importance.

It has been found possible to realize, in this filler-material composition, a filler system that is sufficient for installation and for sealing, without any requirement for disproportionate increase of the thickness of the sealing element in comparison with sealing elements of the prior art.

The density of the fill layer is advantageously between 1.9 and 3.5 g/cm$^3$, preferably between 2.2 and 3.0 g/cm$^3$ and particularly preferably between 2.4 and 2.8 g/cm$^3$.

In another embodiment of the present invention, in layering direction, the fill layer is thicker than the primary layer and/or secondary layer. It is particularly preferable that, in layering direction, the fill layer is from 1 to 150 times thicker, preferably 15 to 80 times and particularly preferably 20 to 40 times thicker, than the primary layer and/or secondary layer, in particular than the total calculated from the thickness of the primary layer and of the secondary layer. The thicknesses of the primary layer and of the secondary layer here are those before creping thereof. It is moreover possible that the primary layer is thicker than the secondary layer. It is thus possible to design the primary layer, which in the installed condition of the sealing element faces toward an environment, in a manner that is advantageously weathering-resistant and resistant to exterior influences. It is preferable that the thickness of the fill layer assumes a value between 1 and 5 mm, preferably between 2 and 4 mm and particularly preferably between 2.2 and 3.2 mm, in particular when the density assumes a value of 2.6 kg/m$^3$. By way of example, the thickness of the primary layer and the thickness of the secondary layer respectively are in essence 0.05 mm, and the thickness of the fill layer is in essence 2.2 or 3.2 mm. In particular, the thickness of the fill layer is dependent on the width of the sealing element.

Another aspect of the present invention provides a process for the production of a sealing element with sandwich structure, in particular of a sealing element of the invention, comprising the steps of:

provision of a metallic primary layer and of a secondary layer, creping, at least to some extent, of the metallic primary layer, and preferably of the secondary layer, at a time subsequent to the creping of the metallic primary layer, joining of the metallic primary layer and of the secondary layer with a fill layer to give the sandwich structure.

All of the features, and advantages thereof, described for the sealing element of the invention can in principle likewise be applied to the process of the invention for the production of a sealing element, and vice versa. It proves to be particularly advantageous here to join the fill layer and the secondary layer after creping of the primary layer, because escape of the filler material during the lamination procedure can thus be avoided. The force required is moreover smaller when the thin primary layer is creped than when a system made of primary layer and fill layer is creped, and therefore creping during the time before the joining procedure has an energy-saving effect on the entire production process. It is moreover possible to avoid defects, e.g. cracks, in the comparatively thin creped primary layer; these could arise more readily during creping of more than one layer. The production sequence of the invention therefore also proves to be advantageous for the surface quality of the sealing element. It is preferable to use an embossing machine for the creping procedure.

In another embodiment of the present invention, the degree of creping established during creping of the metallic primary layer is greater than the final degree of creping of the primary layer on the finished sealing element. Consideration is thus advantageously given to the fact that creping is reduced in the course of the subsequent joining process. It is preferable that the degree of creping for the finished sealing element is in essence established in a controlled manner, i.e. within a tolerance range of +/−5% in respect of the degree of creping, during the time after creping of the primary layer and/or of the secondary layer. By way of example, degree of creping of 35% is an initial converted to a degree of creping of 25%+/−5%. To this end, by way of example, a tensile force which conveys the sandwich structure along the longitudinal direction, or a compressive force exerted on the sandwich structure by rolls, is adjusted in a manner that establishes the desired degree of creping on the finished sealing element.

In another embodiment of the present invention, during the joining procedure, the fill layer is laminated onto the metallic primary layer, in particular by means of a calendar device, and/or the sandwich structure is edge-crimped. It is preferable that the sealing element is edge-crimped in the edge region, for example in a longitudinal region extending in longitudinal direction. It is moreover preferable that, after edge-crimping, the sealing element is cut to size, in particular as required by the envisaged frame element on which the sealing element is to be attached.

Further advantages and features can be found in the description below of preferred embodiments of the subject matter of the invention with reference to the attached figures. Individual features of an individual embodiment can be combined with one another here for the purposes of the invention.

DETAILED DESCRIPTION

Figure 1:
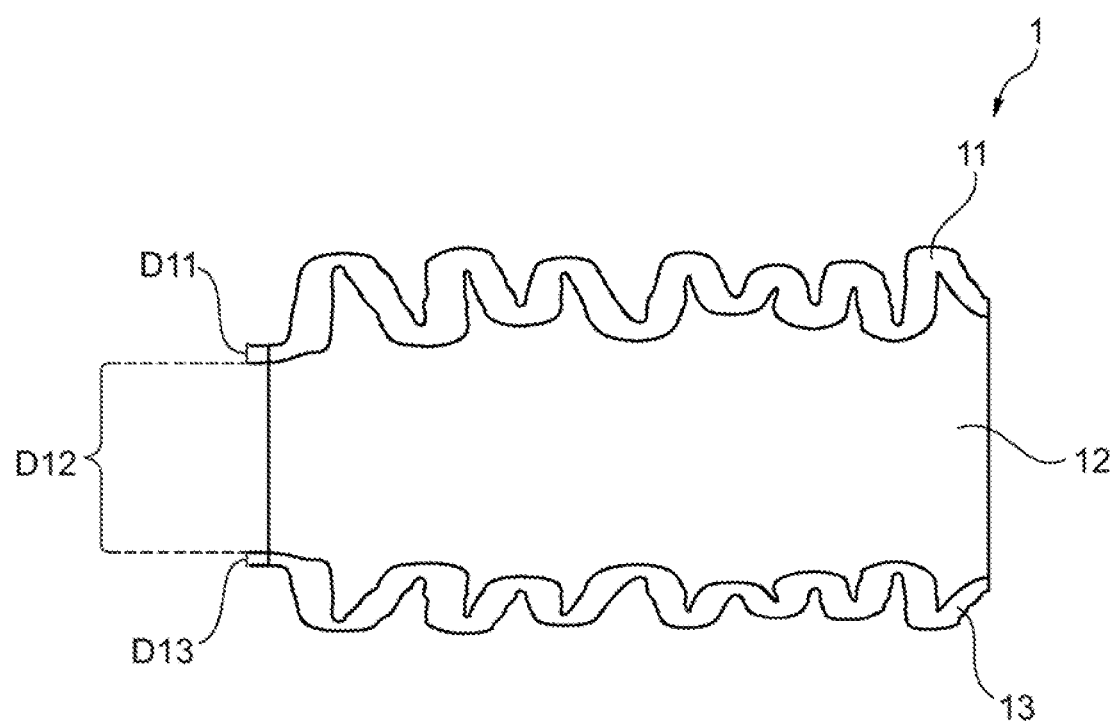
FIG. 1 shows: a sealing element in a preferred embodiment of the present invention.

FIG. 1 depicts a sealing element 1 in a first preferred embodiment of the present invention. In particular, the sealing element 1 is intended for the sealing of a region of intersection between a frame component, preferably a window frame or roof-window frame, or chimney, and masonry or a roof structure. By way of example, the sealing material 1 in its basic form is designed as tape or strip. The sealing element 1 here can preferably be provided with prescribed dimensions, preferably dependent on the size of the frame element. In order, during the assembly of the sealing element 1, to avoid undesired non-butting joints or bumpy surfaces, the design of the sealing element 1 is such that it provides, at least in some regions, an elongation reserve.

This elongation reserve permits local long-lasting elongation of the sealing element 1 in relation to other regions of the sealing element 1. In the embodiment depicted, the elongation reserve is formed by providing a creped metallic primary layer 11, preferably made of aluminum. This creped metallic primary layer 11 forms, together with a fill layer 12 and a secondary layer 13, at least one portion of a sandwich structure of the sealing element 1. It is preferable here that, in layering direction S, the fill layer 12 comprises bitumen and is arranged between the primary layer 11 and the secondary layer 13. In the working example depicted, the secondary layer 13 is likewise metallic and creped. It is also conceivable that the primary layer 11 and the secondary layer 13 respectively have been creped only in some regions, where, in layering direction S, creped regions of the primary layer 11 and of the secondary layer 13 overlap to some extent, overlap completely, or do not overlap at all.

It is possible here that the primary layer 11 and the secondary layer 13 have been manufactured from the same material or from different materials. It is preferable that the material of the primary layer 11 and/or of the secondary layer 13 corresponds to the material from which the frame element has been manufactured. The invention moreover provides that the primary layer 11 and/or the secondary layer 13 is thinner than the fill layer 12. By way of example, the thickness D12 of the fill layer 12 is 1 to 150 times, preferably 15 to 80 times and particularly preferably 20 to 40 times, as thick as the thickness D11 of the primary layer 11 and/or the thickness D13 of the secondary layer, in particular of the total thickness calculated from the thickness D11 of the primary layer 11 and from the thickness D13 of the secondary layer 13. In particular, the primary layer 11 and/or the secondary layer 13 cover the bitumen-comprising fill layer 12, in order to render the sealing element 1 weathering-resistant and preferably dimensionally stable. The thicknesses D11 and D12 here are in particular based on the thicknesses before creping.

By means of the bitumen-comprising fill layer 12 it is possible to realize, in controlled manner, for the sealing element 1, a weight that reduces the ability of wind to displace the sealing element 1, i.e. during installation thereof. The bitumen-comprising fill layer 12 here changes its shape in the regions that are elongated during fitting of the sealing element 1. It is preferable that a filler material, e.g. iron oxide and/or ground limestone and/or lime, has been added to the fill layer 12 for controlled achievement of a comparatively high weight per unit area.

Figure 2:
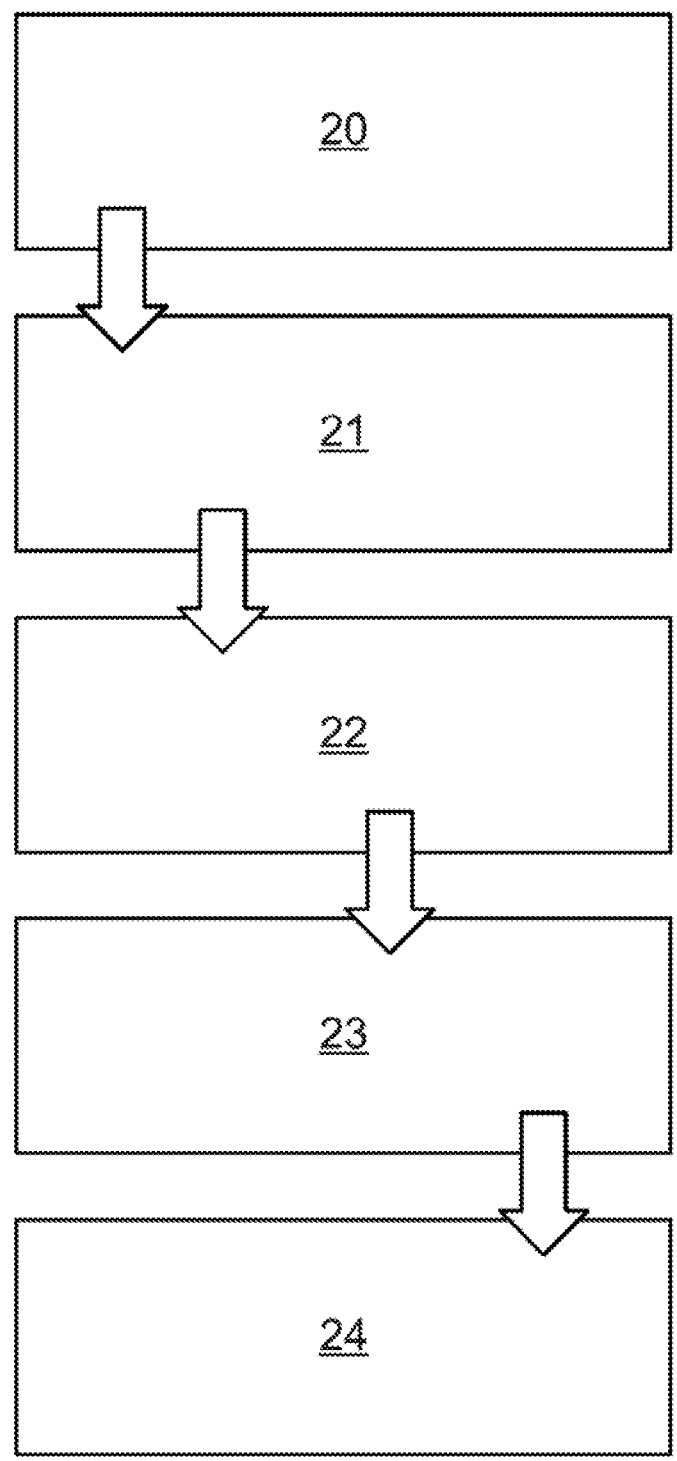
FIG. 2 shows: a process for the production of a sealing element of the present invention.

FIG. 2 illustrates a process for the production of a sealing element 1, in particular of a sealing element 1 as depicted in FIG. 1. It is preferable here to begin with provision 20 of a metallic primary layer 11 and of a secondary layer 13. The metallic primary layer 11 and/or the metallic secondary layer 13 is/are then creped, for example by means of an embossing machine. The degree of creping established during the creping procedure 21 is preferably higher than the desired target degree of creping intended for the finished sealing element 1. The bitumen-comprising fill layer 12 is then applied, preferably laminated, to the creped metallic primary layer 11. By way of example, a calendar device is used for this purpose. The desired target degree of creping can preferably be established in a targeted manner by using a tensile force acting on the assembled sandwich structure during conveying thereof, and by rolling, for example in the calendar device. Application 22 of the fill layer 12 and the joining procedure 23 to give the sandwich structure are followed by a edge-crimping procedure 24. By way of example, the sealing element 1 is edge-crimped at an edge or in an edge region. Finally, the sealing elements 1 are divided to provide the desired length.

Figure 3:
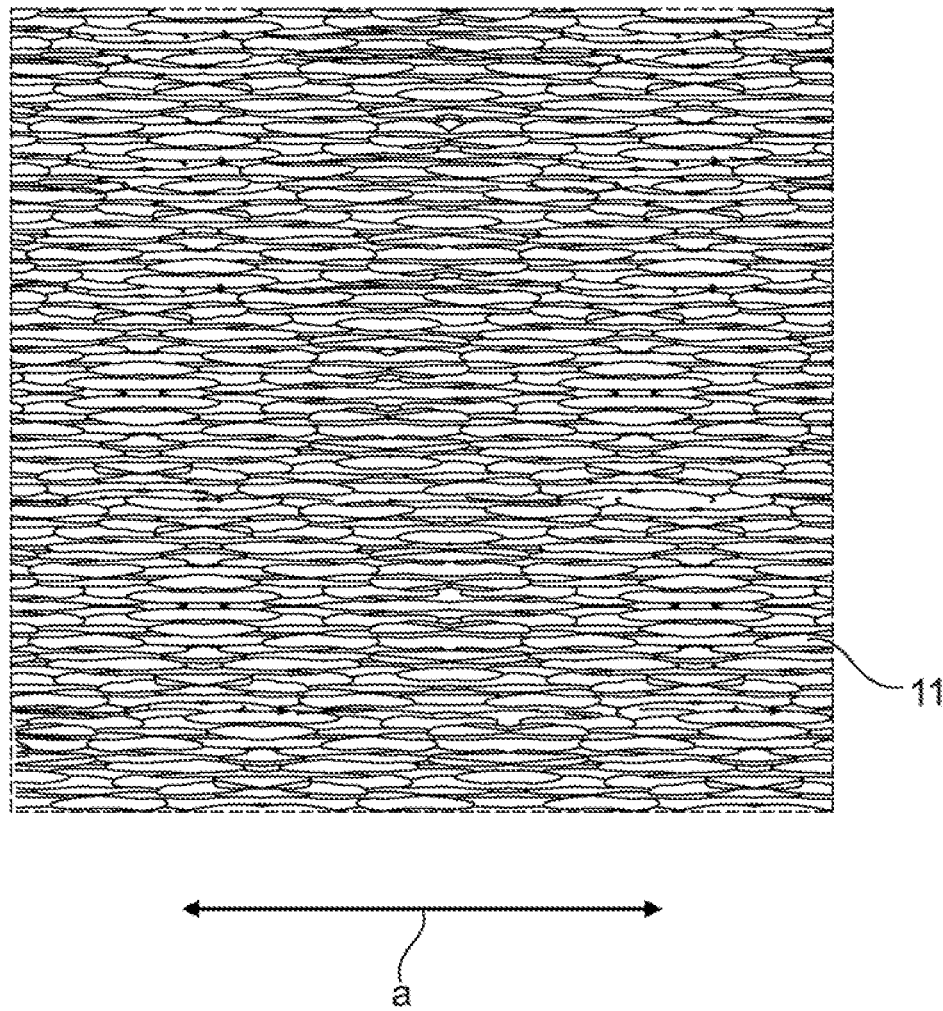
FIG. 3 shows: a creped primary layer for a sealing element of the present invention

FIG. 3 depicts a creped region, for example in the primary layer 11 or secondary layer 13, in an example of an embodiment of the present invention. In particular, creping differs from pleating, in which a metal layer is folded in the manner of a concertina, in that distribution of folds is irregular. By way of example, the folds are arranged irregularly in their distance from one another in longitudinal direction of the sealing element 1 in the form of tape, and the folds have different heights. The crepe structures moreover do not extend across the entire width in transverse direction of the sealing element in the form of tape along a line in essence running perpendicularly in relation to the edge of the sealing element. Instead, it is preferable during creping that the fold line that follows the peak of each fold is curved in relation to the perpendicular direction.

Figure 4:
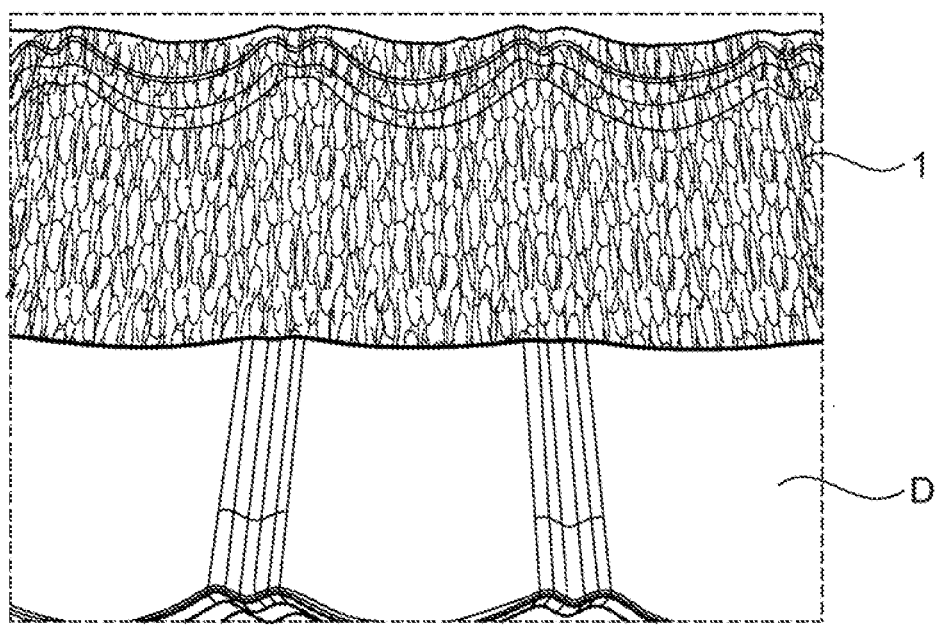
FIG. 4 shows: a sealing element in an example of an embodiment of the present invention on a roof element.

The sealing element in an example of an embodiment of the present invention in FIG. 4 is positioned on a roof element, in particular a metallic roof element. In particular, the design of the sealing element is such that its shape can be fitted to the shape of the roof element. This means that the shape of the sealing element can be changed until it has been fitted to the external shape of one or more roof elements. The width of the roof element is by way of example between 140 mm and 260 mm.

REFERENCE SIGNS

1 Sealing element
11 Primary layer
12 Fill layer
13 Secondary layer
20 Provision
21 Creping procedure
22 Lamination
23 Joining procedure
24 Edge-crimping procedure
S Layering direction
D11 Thickness of primary layer
D12 Thickness of fill layer
D13 Thickness of secondary layer
Q Perpendicular direction
D Roof element

What is claimed is:

1. A sealing element with sandwich structure, the sealing element comprising:
    a metallic primary layer which has been creped at least in some regions in order to form an elongation reserve of the sealing element;
    a secondary layer; and
    a fill layer comprising bitumen arranged between the primary layer and the secondary layer,
    wherein the fill layer comprises a filler material, and a proportion of the filler material is 50% to 80% of the fill layer.

2. The sealing element as claimed in claim 1, wherein the secondary layer is:
    at least one of metallic and has been creped at least in some regions, or
    an adhesive layer.

3. The sealing element as claimed in claim 1, wherein a thickness, measured in a layering direction, of at least one of the primary layer and the secondary layer is 0.02 to 0.1 mm.

4. The sealing element as claimed in claim 1, wherein the density of the fill layer is between 1.9 and 3.5 g/cm$^3$.

5. The sealing element as claimed in claim 1, wherein, in a layering direction, the fill layer is thicker than at least one of the primary layer and the secondary layer.

6. A process for the production of a sealing element with a sandwich structure, the process comprising the steps of:
    providing a metallic primary layer and a secondary layer;
    creping the metallic primary layer; and
    after creping the metallic primary layer, joining the metallic primary layer and the secondary layer with a fill layer comprising bitumen arranged between the primary layer and the secondary layer to form the sandwich structure,
    wherein the fill layer comprises a filler material, and a proportion of the filler material is 50% to 80% of the fill layer.

7. The process as claimed in claim 6, wherein a degree of creping established during creping of the metallic primary layer is greater than a final degree of creping of the primary layer on the finished sealing element.

8. The process as claimed in claim 6, wherein, during the joining procedure, at least one of the fill layer is laminated onto the metallic primary layer and the sandwich structure is edge-crimped.

* * * * *